(12) United States Patent
Fontaine et al.

(10) Patent No.: US 7,284,574 B2
(45) Date of Patent: Oct. 23, 2007

(54) APPARATUS FOR ACCURATE POWDER METERING

(75) Inventors: Ivan-William Fontaine, Nogent-sur-Marne (FR); Patrick Herbelin, Pommeuse (FR)

(73) Assignee: Mettler-Toledo Flexilab SAS, Collegien (FR)

( * ) Notice: Subject to any disclaimer, the term of this patent is extended or adjusted under 35 U.S.C. 154(b) by 212 days.

(21) Appl. No.: 10/533,500

(22) PCT Filed: Oct. 31, 2003

(86) PCT No.: PCT/FR03/03253

§ 371 (c)(1), (2), (4) Date: May 2, 2005

(87) PCT Pub. No.: WO2004/042334

PCT Pub. Date: May 21, 2004

(65) Prior Publication Data

US 2006/0011653 A1    Jan. 19, 2006

(30) Foreign Application Priority Data

Oct. 31, 2002   (FR) ................................. 02 13676

(51) Int. Cl.
*B65B 1/04* (2006.01)
(52) U.S. Cl. ............................ 141/72; 141/83; 366/279
(58) Field of Classification Search ................. 141/83, 141/255, 256, 71, 72; 222/185.1, 196, 198, 222/200; 366/241–244, 255, 256, 260, 277, 366/278, 279, 282, 283
See application file for complete search history.

(56) References Cited

U.S. PATENT DOCUMENTS 3,078,685 A * 2/1963 Flournoy ..................... 53/432

(Continued)

FOREIGN PATENT DOCUMENTS

DE     197 42 663 A1    6/1998

(Continued)

OTHER PUBLICATIONS

Pandit, "Meβsignalverarbeitung und Regelung in Abfull-und Absackanlagen", Wagen und dosieren, Verlasggesellschaft Keppler, Mainz, DE, 19:92-96.

(Continued)

*Primary Examiner*—Steven O. Douglas
(74) *Attorney, Agent, or Firm*—Occhiuti Rohlicek & Tsao

(57) ABSTRACT

An apparatus for accurately metering out powder, comprising a container of powder, comprising an adjustable opening through which the powder is dispensed, said opening being in direct communication with the container; adjusting means for adjusting said opening; and a checking means for checking the amount of powder dispensed, in relation with said adjusting means; and a vibrating and/or tapping means for vibrating or tapping the container, wherein the container further comprises a stirrer situated within the interior volume of said container, and wherein said stirrer is arranged along an axis passing through the opening, said stirrer comprising; a first end arranged near the mid-plane of the opening, and a second end at the opposite end to the first end and which is connected to a device transmitting to the stirrer a back-and-forth movement along said axis passing through the opening, and possibly a rotary movement about said axis passing through the opening.

26 Claims, 7 Drawing Sheets

U.S. PATENT DOCUMENTS

| | | | | |
|---|---|---|---|---|
| 4,696,329 | A * | 9/1987 | Izzi ................................ | 141/1 |
| 4,836,417 | A | 6/1989 | Uchiyama et al. ............. | 222/63 |
| 4,907,891 | A * | 3/1990 | Pointon ..................... | 366/76.3 |
| 5,738,153 | A | 4/1998 | Gerling et al. ................. | 141/83 |
| 6,056,027 | A | 5/2000 | Patterson .................... | 141/370 |
| 6,354,339 | B2 * | 3/2002 | Luchinger ................... | 141/83 |
| 2001/0027823 | A1 | 10/2001 | Luchinger ................... | 141/83 |

FOREIGN PATENT DOCUMENTS

| | | |
|---|---|---|
| DE | 198 09 625 A1 | 9/1999 |
| EP | 0 223 088 | 5/1987 |
| EP | 1 152 228 A2 | 5/2002 |
| EP | 1 152 228 A3 | 5/2002 |
| JP | 58061415 | 4/1983 |
| NL | 9 200 532 A | 10/1993 |
| WO | WO 02/29371 A1 | 4/2002 |
| WO | WO 02/44669 A1 | 6/2002 |

OTHER PUBLICATIONS

Prospectus: Sartorius Laboratory: "9 Modeles Avec Une Precision de Lecture de 1 mg et de 10 mg: A vous de choisir", Oct. 1986.
"Accelerator Dual Dosing Station", Chemspeed.
"A truly Flexible Powder Dispensing Workstation", Powdernium Many-To-Many, p. 1-2, Jan. 2002.

* cited by examiner

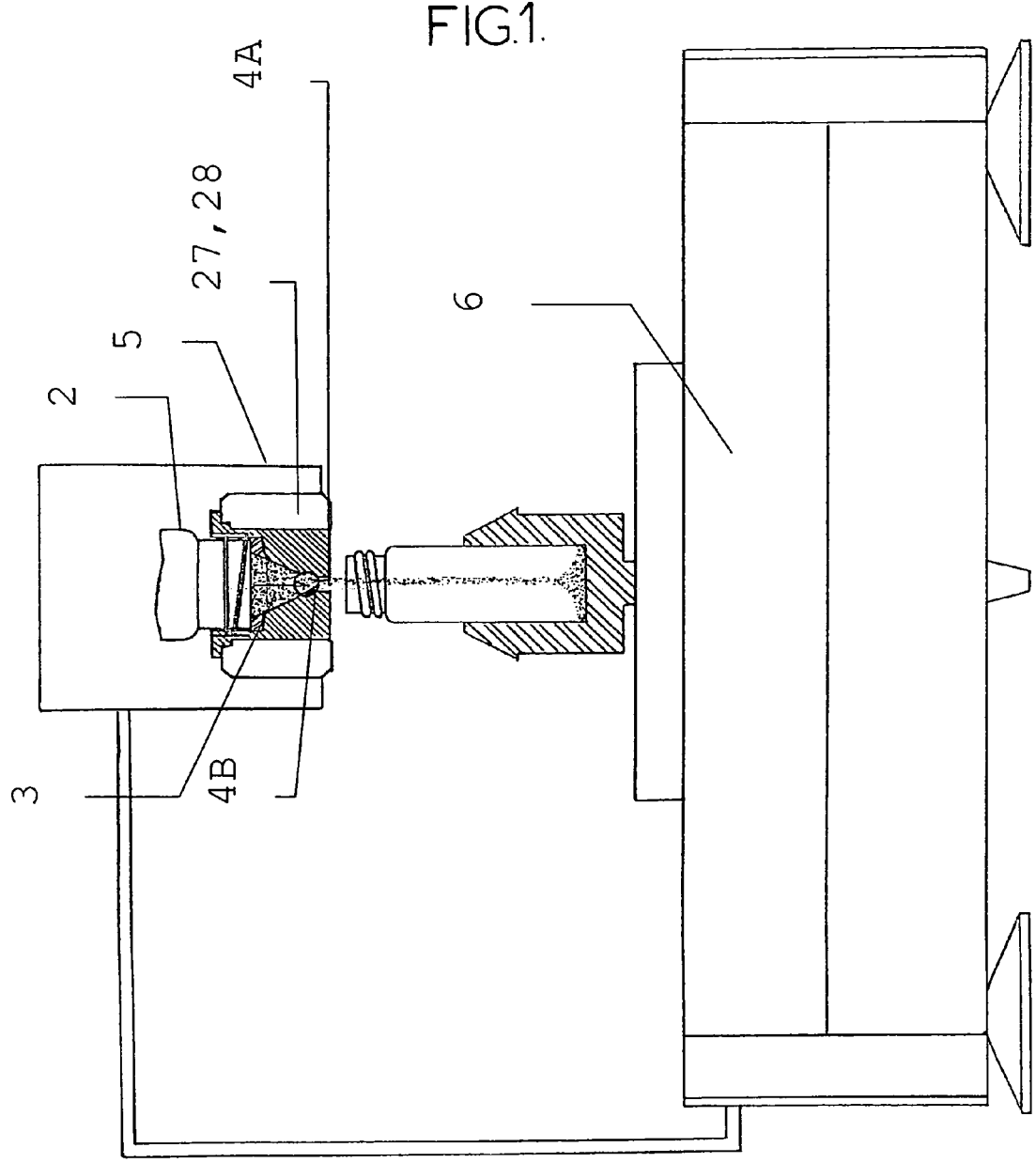

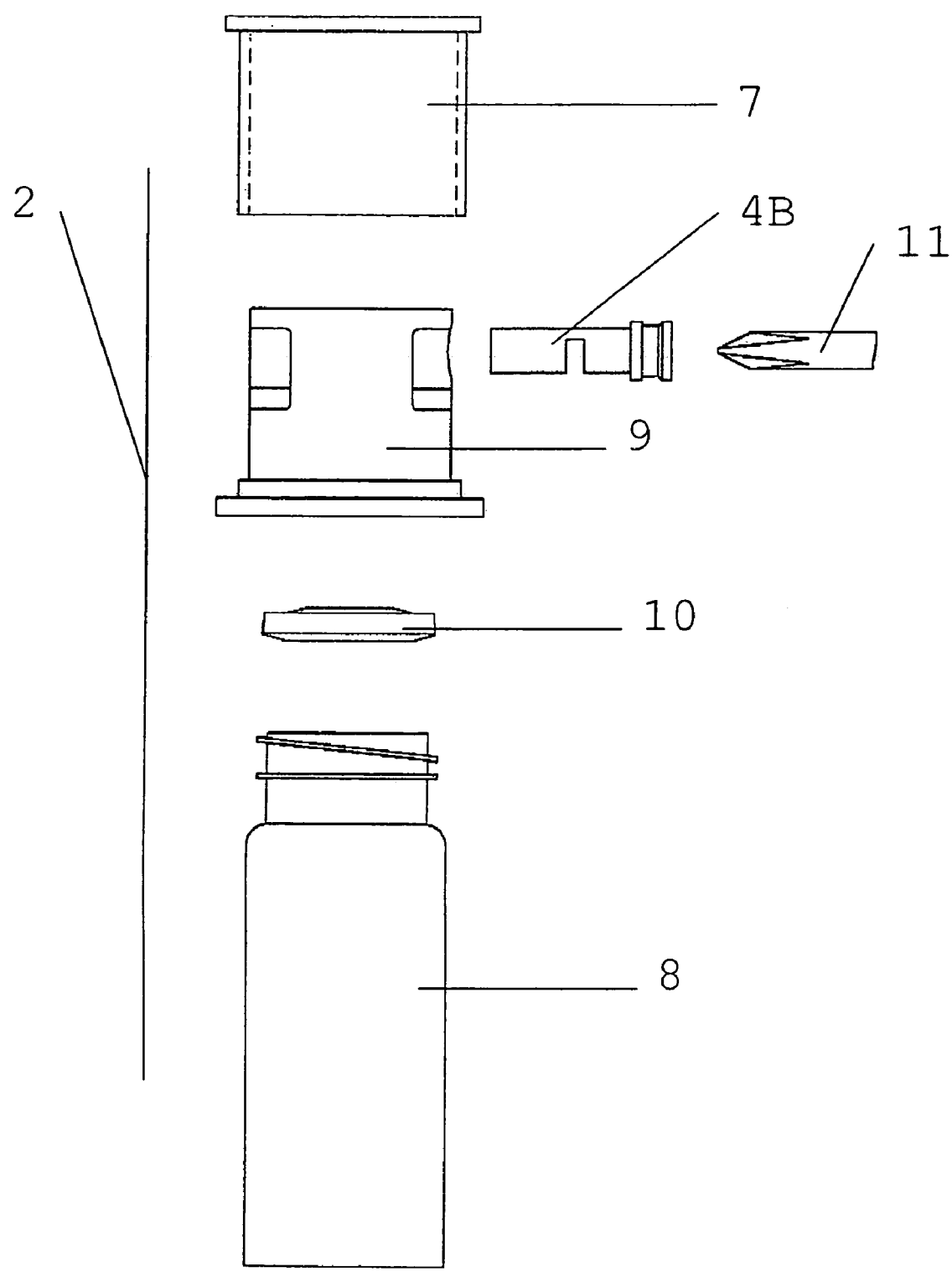

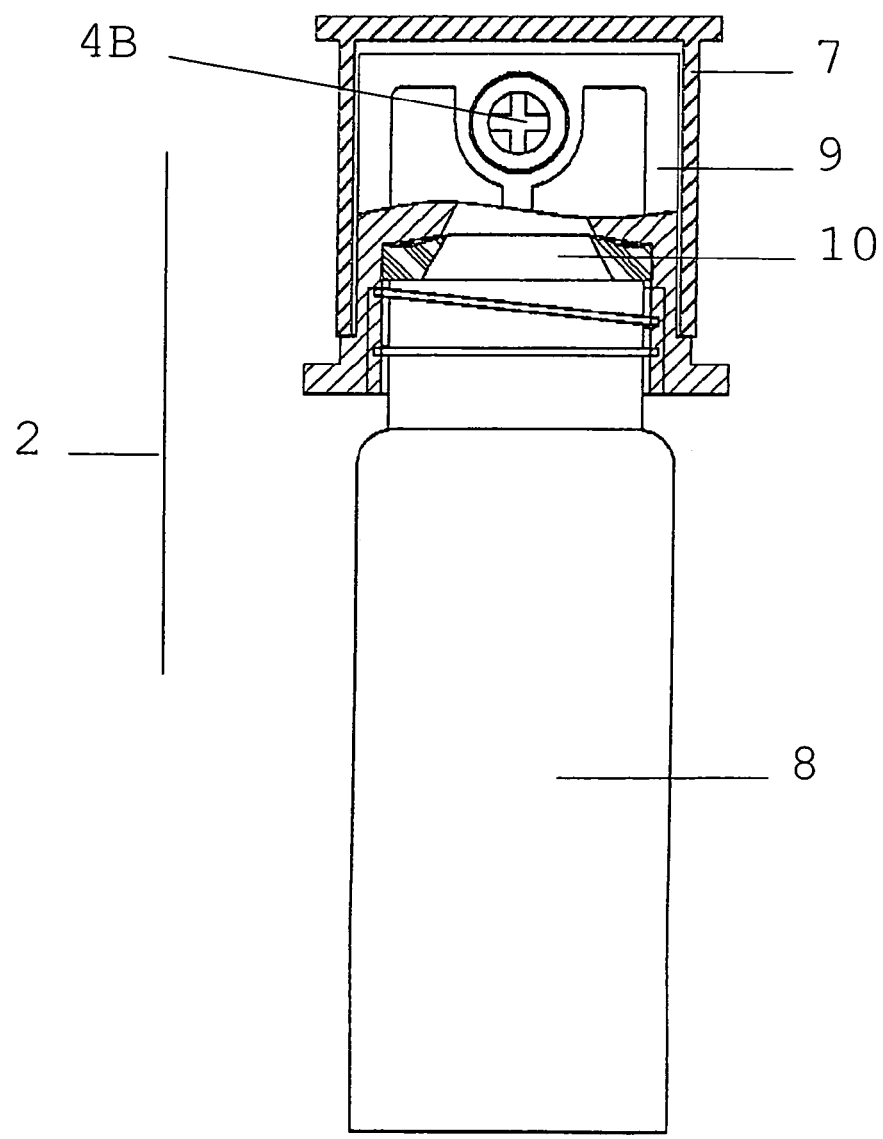
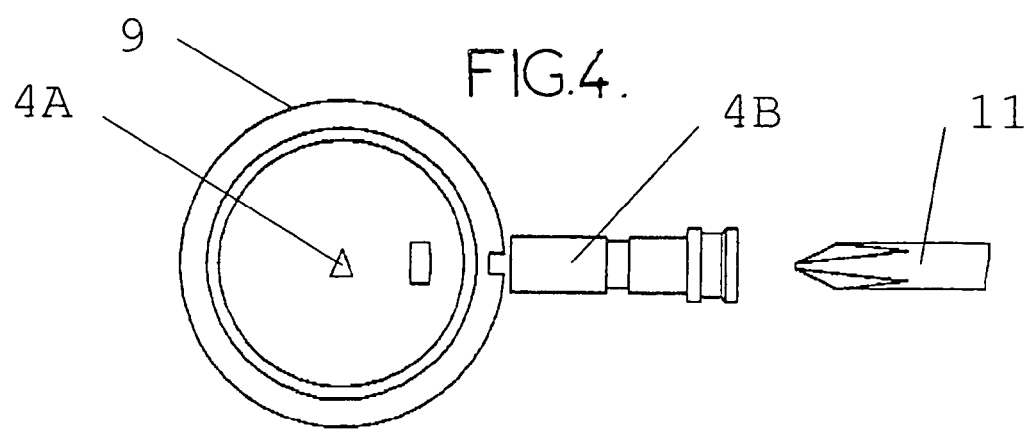

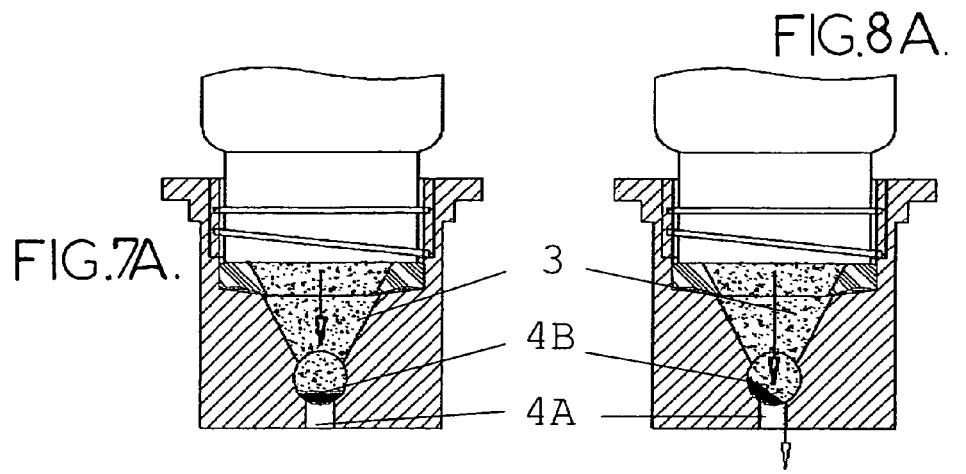
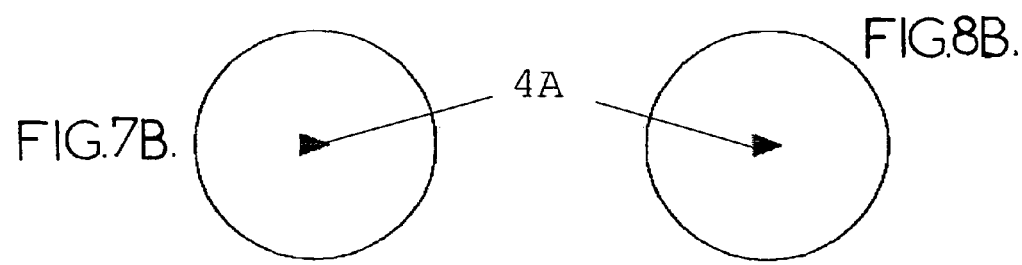
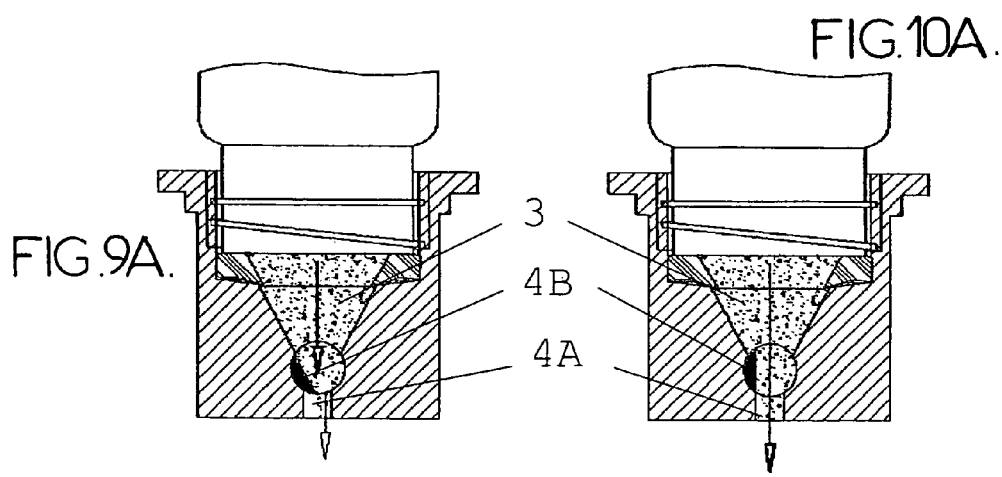
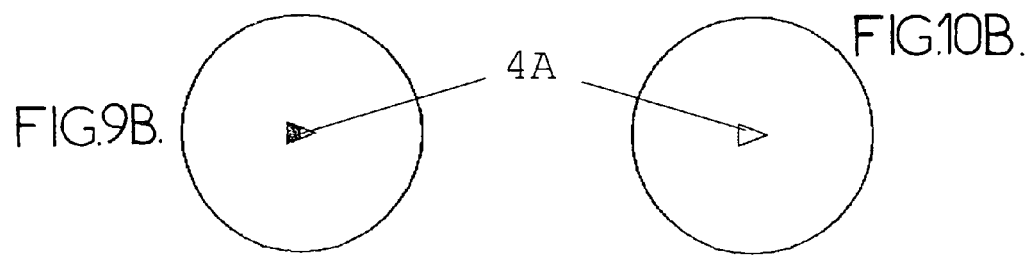

APPARATUS FOR ACCURATE POWDER METERING

CROSS-REFERENCE TO RELATED APPLICATIONS

This application is the National Stage of International Application No. PCT/FR2003/003253, filed Oct. 31, 2003, which claims the benefit of France Patent Application Serial No. 02/13,676, filed on Oct. 31, 2002. The contents of both applications are hereby incorporated by reference in their entireties.

The present invention relates to an apparatus for accurately metering out powder and to the method for implementing it and to its use.

In the chemical and pharmaceutical industry, it is often necessary to accurately meter out reagents or products in powder form, particularly from a combinatorial library. When tests are being conducted on a great many products in powder form, the successive metering operations represent a particularly painstaking task to be performed by the staff involved.

Aside from the repetitive nature of the work, the staff involved have to invest a considerable amount of time and attention to this type of metering.

These metering operations are all the more painstaking since the powders that are to be metered are generally of very different natures and have flow indexes from a very wide range.

Furthermore, the metering difficulty is heightened by the fact that the amounts to be metered vary from a milligram to a hundredth of a gram, and at the same time require an accuracy in the order of one tenth of a milligram.

Finally, it is absolutely essential to avoid, on the one hand, the staff involved being contaminated with the products being metered and, on the other hand, cross-contamination or cross-pollution of the products, a problem well known to those skilled in the art, as this makes the contaminated samples unusable.

An initial approach sought to automate these metering operations to make them less painstaking and more reliable, while at the same time maintaining an acceptable metering accuracy.

Patent application FR 2 672 035 illustrates this type of device making it possible to dispense defined masses of powders. This device consists of a powder receptacle and of a metering stopper comprising a hopper feeding an endless screw. This endless screw conveys powder to a dispensing opening situated on the axis of rotation of the endless screw and on the side of the stopper.

Another device of the same type is described in patent application FR 2 775 958. The principle of use of a stopper equipped with an endless screw with a dispensing opening at the end of the endless screw is, incidentally, already mentioned in a document as old as U.S. Pat. No. 2,593,803.

These devices are adequate for delivering masses of powders from 5 to about 8 mg, with an accuracy in the order of 1 mg.

By contrast, such devices are not suited to metering operations accurate to one tenth of a milligram.

Furthermore, they are not suited to metering quantities of the order of one gram because the rate of metering is very soon limited by the endless screw dispensing system. The metering time then becomes excessively long.

As far as metering out large quantities of powder is concerned, mention may be made of the device described in German utility model No. 89 14 389 U in the name of Fink-Chemie GmbH. This device is equipped with an inlet feeding an endless screw with powder. This endless screw conveys the powder toward a dispensing opening formed in the lower surface of the device.

It is, however, immediately evident that this type of device is not suited to accurate metering of large amounts and small amounts of powders of varying types as is demanded in particular for combinatorial library use. This device does, by contrast, seem to be suited to the metering out of large masses of certain types of powder where the accuracy is of lesser importance. This utility model also makes no mention of any requirements on the accuracy of the metering.

Another device for accurately metering out powder, developed by the Applicant Company, has been described in patent applications FR 01 06090 and PCT/FR02/01484, neither of which has yet been published.

These patent applications describe an improved metering stopper to be fixed on a powder receptacle. This metering stopper comprises a hopper which feeds an endless screw. This endless screw transports the powder laterally as far as an opening situated on the lower face of the stopper.

The improvement, which consists in placing the opening on the lower face of the stopper, has made it possible to achieve mean metering accuracies of the order of 0.1 mg, that is to say accuracies that are extremely satisfactory for combinatorial library use.

However, disadvantages stem from the use of an endless screw mechanism in these metering devices.

Aside the problem of the slowness of the metering operation as mentioned hereinabove, this type of mechanism considerably restricts the extent to which the metering apparatuses can be miniaturized. This is because an endless screw can be miniaturized only down to a limiting size below which it can no longer fulfill its function of transporting the powder with certain powders. As a consequence of this, it is difficult to miniaturize metering stoppers employing an endless screw below 2 cm for metering out certain powders.

Now, most pill-making equipment used in a combinatorial library setting, and to which the metering stoppers are fixed, are about 1.5 cm or less in diameter.

Furthermore, the endless screw mechanism is no longer as effective when it has to dispense powders with a flow index that is either very low, that is to say below 2, or very high, that is to say above 8. This is because, when the flow index is very low, the endless screw has difficulty in conveying the powder as far as the dispensing opening and, on the other hand, when the powder has a very high flow index, it slips of its own accord along the screw thread without the endless screw being actuated and being able to play its part in checking of the dispensing.

Another disadvantage is that, in the case of powders with a large particle size, the screw thread of the endless screw has a tendency to crush the grains. Now, in certain applications, this tendency is absolutely undesirable because it degrades the metered powder.

Finally, as chemical analysis methods are used on increasingly small quantities of powder, the accuracy requirements are accordingly becoming ever more severe.

Considering that there is a need for metering apparatus that addresses these technical difficulties, the applicant company has developed the apparatus of the present invention for accurately metering out powder.

The invention is also aimed at a method for accurately metering out powder employing the device of the invention and at the use of this device for the accurate metering out of powder.

The metering device of the invention is particularly suited to aliquoting from a combinatorial library or for fractionation from bottles of reserve. It can be used with powders or small solids of very differing particle sizes and appearance, for example talc, lactose, cornstarch or sand. In this patent application and according to the definition given in the $3^{rd}$ edition of the DUVAL Dictionary of Chemistry [Dictionnaire de la Chimie $3^{ème}$ édition], the term "powder" denotes a finely divided solid.

The figures introduced hereinbelow illustrate particular embodiments of the invention. Their main purpose is to make the invention easier to understand and not to restrict it to only those embodiments that have been illustrated.

FIG. 1 is a schematic depiction of metering apparatus according to the invention.

FIG. 2 is an exploded side view of a container according to the invention.

FIG. 3 is a sectioned view of a container according to the invention.

FIG. 4 is a view of the underside of a container according to the invention, the adjustable opening of which has been dismantled.

FIGS. 7A, 8A, 9A and 10A are sectioned views of a container according to the invention while it is in the process of operating.

FIGS. 7B, 8B, 9B and 10B are views of the underside of a container according to the invention while it is in the process of operating.

Figure 5:
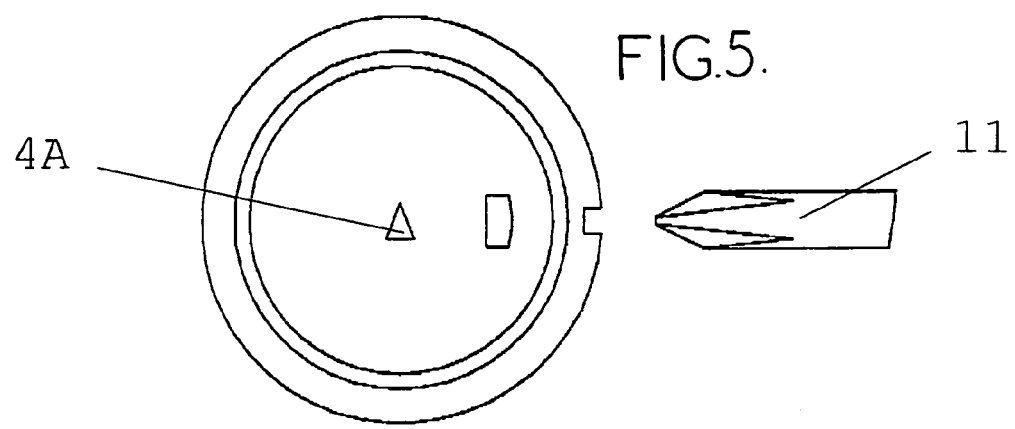
FIG. 5 is a view of the underside of a container according to the invention.

The apparatus (1) for accurately metering out powder, that is the subject of the invention, comprises:
- a container (2) of powder (3), comprising an adjustable opening (4A, 4B) through which the powder (3) is dispensed, said opening (4A, 4B) being in direct communication with the container (2);
- adjusting means (5) for adjusting said opening (4A, 4B);
- a checking means (6) for checking the amount of powder (3) dispensed, in relation with said adjusting means (5); and
- a vibrating (27) and/or tapping (28) means for vibrating or tapping the container (2).

The Applicant Company has discovered that, surprisingly, the vibrating and/or tapping means are, in their own right, means for substantially improving the accuracy with which the powders can be metered out. What happens is that vibrating and/or tapping the container (2) allows very fine metering of the powders, this being finer than is permitted by varying the opening (4A, 4B) alone.

As a result of this, the apparatus (1) allows powders to be dispensed with an accuracy of 100 µg or better, preferably with an accuracy of 50 µg or better, and more preferably still with an accuracy of 10 µg or better. That means that with certain powders, the apparatus (1) is capable of dispensing with an accuracy of 2 µg or better, and even with an accuracy as good as 1 µg. With certain powders, the apparatus (1) can therefore meter to an accuracy of one grain of powder.

In terms of mean accuracy, the apparatus (1) is able to dispense powders with a mean accuracy of 0.5 mg or better, preferably with a mean accuracy of 0.2 mg or better, and more preferably still with a mean accuracy of 0.1 mg or better. The mean accuracy is the accuracy obtained for most weighings, that is to say for at least 50% of the weighings performed, preferably at least 75% and more preferably still at least 85% of the weighings. The maximum figure of 100% of the weighings could even be achieved in some cases.

Better accuracy is to be understood as being finer or superior accuracy, so that the metering is more precise.

Furthermore, the apparatus (1) according to the invention makes it possible to meter out powders having a flow index lying within a very broad range. Powders having a flow index of 2 or lower or of 8 or higher, preferably powders having a flow index below 1 or above 9, or even of 10 or higher, can be metered out with the abovementioned accuracies.

The flow index is defined as the greater or lesser aptitude of the powder to being metered. This aptitude is influenced by various factors such as: viscosity, electrostatic charges borne, or alternatively the particle size or moisture content and capillary forces. This flow index is generally defined on a scale from 0 to over 10. Powders with an index from 0 to 2 are said to be highly cohesive, those from 2 to 4 are said to be cohesive, those from 4 to 10 are said to be average and those with an index higher than 10 are said to be free flowing. The flow index may for example be determined by the JENIKE test, which is a test well known to those skilled in the art.

The document entitled "MESSSIGNALVERARBEITUNG UND REGELUNG IN ABFULL- UND ABSACK-ANLAGEN", WAGEN UND DOSIEREN, VERLAGSGE-SELLSCHAFT KEPPLER, MAINZ, DE, VOL. 19, No. 3, pages 92-96 XP000003020 by PANDIT, relates to the processing of the measurement signal and the adjustments for filling and bagging devices. That document incidentally describes an apparatus consisting of a container provided with a variable opening containing powder to be dispensed, means for adjusting the opening and a balance for weighing out the powder. That document does not, by contrast, seem to cover accurate metering. It should also be emphasized that the document does not quote any metering accuracy.

Furthermore, unlike the invention, that document does not describe a means for vibrating and/or for tapping the container.

U.S. Pat. No. 5,738,153 also describes a device for metering out powder comprising a valve-controlled variable opening. By contrast, that document does not describe a means for vibrating and/or for tapping the container either.

As a result, none of the metering devices described in the prior art is able to achieve the metering accuracies achieved by the device according to the invention.

Furthermore, because the apparatus (1) according to the invention has no endless screw, it can be miniaturized down to dimensions smaller than 0.2 cm, or even dimensions of 1 cm or smaller.

In addition, the absence of an endless screw allows faster dispensing, without grinding the grains of powder to be metered. By way of example, metering 2 g of powder, for example cornstarch, has been achieved in under 20 seconds, this being with the accuracies mentioned hereinabove.

The detailed description which follows, describing the apparatus (1), the means it comprises and their interaction, will allow for a better understanding of the invention.

The apparatus (1) according to the invention comprises a container (2) of powder (3).

This container can be in one or more parts.

In one particular embodiment, the container (2) is in two parts, a receptacle part (8) and a stopper part (9). In this case, the receptacle (8) and stopper (9) parts can be fixed together by any means known to those skilled in the art, for example by screw-fastening or clipping. In order to seal the connection between the receptacle (8) and the stopper (9), a gasket (10) may be provided.

A hopper (14) may also be arranged inside the container (2) to guide the powder (3) as far as the adjustable opening (4A, 4B) and thus assist with feeding said opening.

The container (2) may be of any size or shape, particularly in the shape of a cone, of circular or non-circular cross section, delimited by a wall, a first and a second end face. These end faces may be perpendicular to the axis of the cone or may not. The container (2) may be made of any material that is thermally stable under the conditions of use and storage and chemically inert with respect to the powders that are to be metered out. This may in particular be a polymer material such as polyethylene, polypropylene, fluorinated polymers, for example polytetrafluoroethylene (Teflon™). In the case of a container (2) made in two parts, each of the receptacle (8) and stopper (9) may be molded.

The container (2) may also be covered by a hood (7) when it is not operating, particularly for storage. This hood (7) preserves the powder (3) against the air.

The container (2) is directly connected or communicated with the adjustable opening (4A, 4B), that is to say communicates or connects in such a way that the powder (3) can be conveyed from the container (2) toward the adjustable opening (4A, 4B) under the simple effect of gravity, particularly without being conveyed by a mechanical element, for example an endless screw.

It is also possible to anticipate various types of adjustable opening, particularly plug-valve (4A, 4B) or slide-valve (4A) controlled. This adjustable opening (4A, 4B) or (4A) will preferably be adjustable to the extent of being completely closed off.

The plug valve (4B) may be of the cylindrical valve type, preferably of the tapered cylindrical valve type for sealing reasons.

The adjustable opening (4A, 4B) is adjusted by adjusting means (5) which are connected to a dispensing checking means (6).

The adjusting means (5) are capable of adjusting the size of the opening so as to allow the metering of the powder (3) to be more or less rapid and more or less accurate. Specifically, the smaller the adjustable opening (4A, 4B) the lower the flow rate of dispensed powder (3) and the greater the accuracy. Conversely, the larger the adjustable opening (4A, 4B), the higher the flow rate of dispensed powder (3) and the lower the accuracy.

Appropriate adjusting means (5) are, for example, a motor connected with a transmission element (11) driving the closure or opening of the adjustable opening (4A, 4B). This adjustable opening (4A, 4B) generally comprises two parts: an actual opening (4A) proper and a mechanism (4B) for opening and closing the opening. A great many shapes can be anticipated for the opening (4A), for example circular, square, diamond-shaped or alternatively triangular. The preferred shape of the adjustable opening (4A, 4B) is, however, the shape of a triangle.

In the case of a plug valve opening (4A, 4B), the transmission element (11) may be a rod, connected to a motor, the cruciform male end of which collaborates with a cruciform female notch at the end, on the axis of the plug (4B).

Metering is checked by a checking means (6). This checking means may comprise any means suitable for determining the amount of powder (3) dispensed. This checking means (6) may for example by an optical means, such as a laser, or a device measuring the volume of the powder. The checking means (6) is preferably a weighing means able to weigh the amount of powder already dispensed through the adjustable opening (4A, 4B). The remainder of this application will mainly discuss weighing means without excluding any other checking means.

An appropriate weighing means (6) is, for example, a balance having a weighing accuracy of 0.1 mg or better.

The checking means (6) is connected to the adjusting means (5). This connection is preferably by way of an electronic relationship.

The checking means (6) measures the amount of powder (3) already dispensed through the adjustable opening (4A, 4B) and returns the measurement value to the adjusting means (5) which, as a function of the weighed value returned, will adjust the metering by opening the adjustable opening (4A, 4B) further or closing it.

The adjusting means (5) may comprise a computer equipped with software. The software may be capable of processing the values of the measurements returned by the checking means (6). This software may also control the adjusting means (5) as a function of the checking measurements supplied by the checking means (6). The adjusting means (5) may also comprise a motor connected to a transmission element (11) actuating the opening or closure of the adjustable opening (4A, 4B).

The adjusting means (5) may furthermore be parameterized as a function of the nature of the powder to be dispensed. What happens is that, if the powder has a high flow index, it will have a tendency to flow very quickly through the adjustable opening (4A, 4B). The software may therefore be parameterized such that the adjustable opening (4A, 4B) is open only a very small amount when metering such powders.

During the metering, the container (2) is tapped and/or vibrated.

The tapping and/or vibrating has/have two main effects.

The first effect is to make it easier to dispense the powder by unclogging the powder or eliminating the roof or chimney effects that occur in the container (2). That makes it easier to feed the adjustable opening (4A, 4B).

The second effect is that of substantially improving the accuracy with which the powders are metered. This is because vibrating and/or tapping causes the powder to move in the container (2) and gradually conveys it as far as the dispensing opening (4A, 4B). Vibrating and/or tapping therefore represent a very fine way of feeding the opening (4A, 4B) and therefore of metering.

In this case, the device according to the invention will advantageously comprise a device encouraging the dispensing of powder, particularly by tapping using, for example, a movable and retractable finger which can strike the container (2), for example 4 times per second, and/or by vibrating using, in particular, a fork in which the device is held.

The person skilled in the art will recognize that numerous types of device are suitable by way of means for vibrating and/or tapping the container (2).

Optional means encouraging dispensing may also be fitted to the apparatus (1) according to the invention.

In the case of powders that do not flow very well or that generate roof effects and in order to make it easier for the powder to drop down toward the opening, the inside of the container (2) may be equipped with stirrers (12) which assist with feeding the adjustable opening (4A, 4B). The purpose of these stirrers is to disturb the roof effects by stirring up the powder or alternatively by forcing product toward the adjustable opening (4A, 4B). Such stirrers (12) may, for example, be a rotary drill fitted with paddles.

In one particular embodiment of the apparatus (1) according to the invention, said stirrer (12) comprises a rotary drill arranged along an axis passing through the opening (4A) and more or less normal thereto, said drill comprising:
- a first end situated near the opening (4A), said first end having a screw thread able to convey the powder toward the opening (4A, 4B),
- a second end at the opposite end to the first end, said second end being fixed to a rotor,
- paddles fixed to the drill and projecting radially from the axis of rotation.

According to another embodiment of the apparatus according to the invention, the stirrer (12) may be arranged along an axis passing through the opening (4A, 4B), said stirrer (12) comprising:
- a first end (12A) arranged near the mid-plane of the opening (4A, 4B), and
- a second end (12B) at the opposite end to the first end (12A) and which is connected to a device transmitting to the stirrer (12) a back-and-forth movement along said axis passing through the opening (4A, 4B), and possibly a rotary movement about said axis passing through the opening (4A, 4B).

The stirrer (12) may be connected reversibly to the device transmitting a back-and-forth and rotational movement to it. The stirrer (12) may, for example, be connected to it by screw-fastening, clipping or any other suitable means known to those skilled in the art.

According to a preferred embodiment of the apparatus (1) according to the invention, the stirrer (12) is a rod (16).

According to another preferred embodiment of the apparatus (1) according to the invention, the first end (12A) of said stirrer (12) comprises a rod (16) and the second end (12B) of said stirrer (12) comprises a leaf (15) bent back on itself to form a loop that is elongate along said axis passing through the opening (4A, 4B), said leaf (15) comprising fins (15A) which project from the interior surface of the bent-over leaf (15) toward said axis.

According to one embodiment of the apparatus (1) according to the invention, the device transmitting a back-and-forth movement to the stirrer comprises:
- a transmission means (17) connected to the second end (12B) of the stirrer (12),
- a pushing means (21),
- a pulling means (18), said pushing means (21) transmitting a translational movement to said transmission means (17) in a first direction along the axis of said transmission means (17) and said pulling means (18) transmitting a translational movement to said transmission means (17) in the opposite direction to the first direction.

The device transmitting a rotary movement to the stirrer may comprise a transmission means (17) connected to the second end (12B) of the stirrer (12), said transmission means (17) comprising driving gearing (22) which is driven by drive gearing (23) fixed to a motor (24).

Furthermore, in one particularly preferred embodiment of the apparatus according to the invention, in the stirrer (12):
- the first end (12A) of said stirrer (12) comprises a rod (16) and the second end (12B) of said stirrer (12) comprises a leaf (15) bent back on itself to form a loop that is elongate along said axis passing through the opening (4A, 4B), said leaf (15) comprising fins (15A) which project from the interior surface of the bent-over leaf (15) toward said axis,
- the device transmitting a back-and-forth movement to the stirrer comprises a transmission means (17) connected to the second end (12B) of the stirrer (12), a pushing means (21), a pulling means (18), said pushing means (21) transmitting a translational movement to said transmission means (17) in a first direction along the axis of said transmission means (17) and said pulling means (18) transmitting a translational movement to said transmission means (17) in the opposite direction to the first direction,
- the device transmitting a rotary movement to the stirrer (12) comprises a transmission means (17) connected to the second end (12B) of the stirrer (12), said transmission means (17) comprising driving gearing (22) which is driven by drive gearing (23) fixed to a motor (24).

The transmission means may, for example, be a bar, shaft or rotor.

The pushing means may, for example, be a pneumatic or hydraulic ram.

The pulling means may, in particular, be a spring or a second pneumatic or hydraulic ram.

The person skilled in the art will recognize that numerous types of material can be used for the stirrer (12). However, the stirrer (12) will preferably be made of foil.

Furthermore, in the apparatus (1) according to the invention, the tapping means and/or the stirrer (12) may be controlled by software as a function of checking measurements supplied by the checking means (6) and possibly as a function of characteristics of the powder (3).

It is also possible to anticipate equipping the container (2) with a scraper for scraping the powder (3) that lies at the bottom of the container (2) to make it easier to dispense when the container (2) is in operation. This scraper may, for example, be a curved blade, preferably mounted to pivot on a vertical axis of the container (2). This scraper may also be a rotary brush. This rotary brush may in particular be positioned and set in rotation on an axis parallel to the plane defined by the adjustable opening (4A, 4B).

The device according to the invention may also be coupled to one or more anti-electrostatic devices that generate an electric field encouraging the distribution of the powder. Without being bound by any particular theory, the Applicant Company believes that the powders to be metered are naturally charged or that the friction between the grains of the product to be metered and the elements of the device generates charged species. The charges give rise to forces causing, in particular, the grains to clump together or causing the grains to be magnetized on contact with the elements of the apparatus (1). As a preference, the apparatus (1) according to the invention is thus equipped with at least one anti-electrostatic device placed on the container (2) at the exit of the adjustable opening (4A, 4B) and generating an electric field that allows the movement of the particles to be routed. In order to cover the entire dispensing opening, use will preferably be made of two anti-electrostatic devices. An anti-electrostatic device may be a spike ionizing probe generating an electrical field of 4 kV for example.

A method for metering out powder employing the apparatus (1) according to the invention may comprise one or more of the following steps:
- bringing the container (2) into the metering position,
- using the adjusting means (5) to open the adjustable opening (4A, 4B),
- vibrating and/or tapping the container (2),
- using the checking means (6) to measure the amount of powder (3) dispensed,
- using the adjusting means (5) to open or close the adjustable opening (4A, 4B) as a function of the measurement returned by the checking means (6),
- adjusting the means that vibrate and/or tap the container (2) as a function of the measurement returned by the checking means (6).

When metering is over, the container (2) is possibly capped with a hood (7) designed for this purpose.

FIG. 1 is an overall view of one embodiment of the apparatus (1) in the course of operation. The container (2) which contains the powder (3) is in the metering position as depicted in section. This container (2) is connected to adjusting means (5) for adjusting the adjustable opening (4A, 4B). The powder is metered through this adjustable opening (4A, 4B) into pill-making equipment arranged under the container (2). This pill-making equipment is placed on the checking means (6) which in this instance is depicted in the form of a precision balance. The checking means (6) is connected with the adjusting means (5). In this figure, the container (2) is held via vibrating means (27) for vibrating the container (2). This vibrating and/or tapping means is a holding fork (27, 28) in this figure. The vibrating and/or tapping means in this instance is combined, that is to say one and the same element.

FIG. 2 is an exploded view of an embodiment of a container (2) made in two parts and with a plug valve opening (4A, 4B). The hood (7) has been removed from the stopper (9). The plug valve (4B) will sit in the housing of the stopper (9) and collaborates with the transmission element (11). The stopper (9) has been unscrewed from the receptacle (8).

FIG. 3 is a sectioned view of a container (2) made in two parts. In this figure, the container (2) is depicted with its adjustable opening (4A, 4B) at the top, that is to say when it is not in operation. Furthermore, the hood (7) covers the stopper (9). The plug valve (4B) is depicted along an axis retreating into and perpendicular to the page. It is possible to make out the cruciform female notch that collaborates with the cruciform male end of the transmission element (11).

Figure 13:
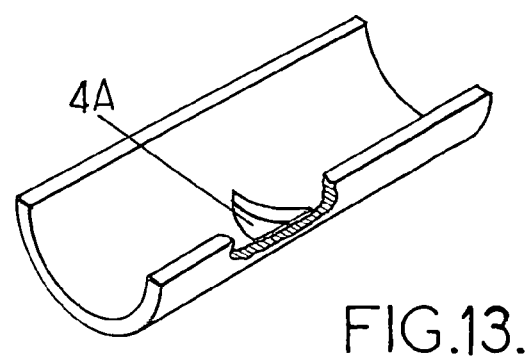
FIG. 13 is a perspective and sectioned view of one particular embodiment of the dispensing opening of the container according to the invention.

FIG. 4 is an exploded view of the dispensing face of the stopper (9) depicted in FIG. 2. The plug valve opening (4A, 4B) comprises a triangular opening (4A) and a plug (4B) out of its housing in the stopper (9). The transmission element (11) has been withdrawn from the plug (4B). FIG. 13 is another view, in perspective and in section, of the triangular opening (4A).

FIG. 5 is a view of the dispensing face of the stopper (9) once fitted. In this view, the plug valve (4B), which cannot be seen, is placed in the stopper (9) and collaborates with the opening (4A). The transmission element (11) is depicted withdrawn from the cruciform notch in the plug (4B).

Figure 6:
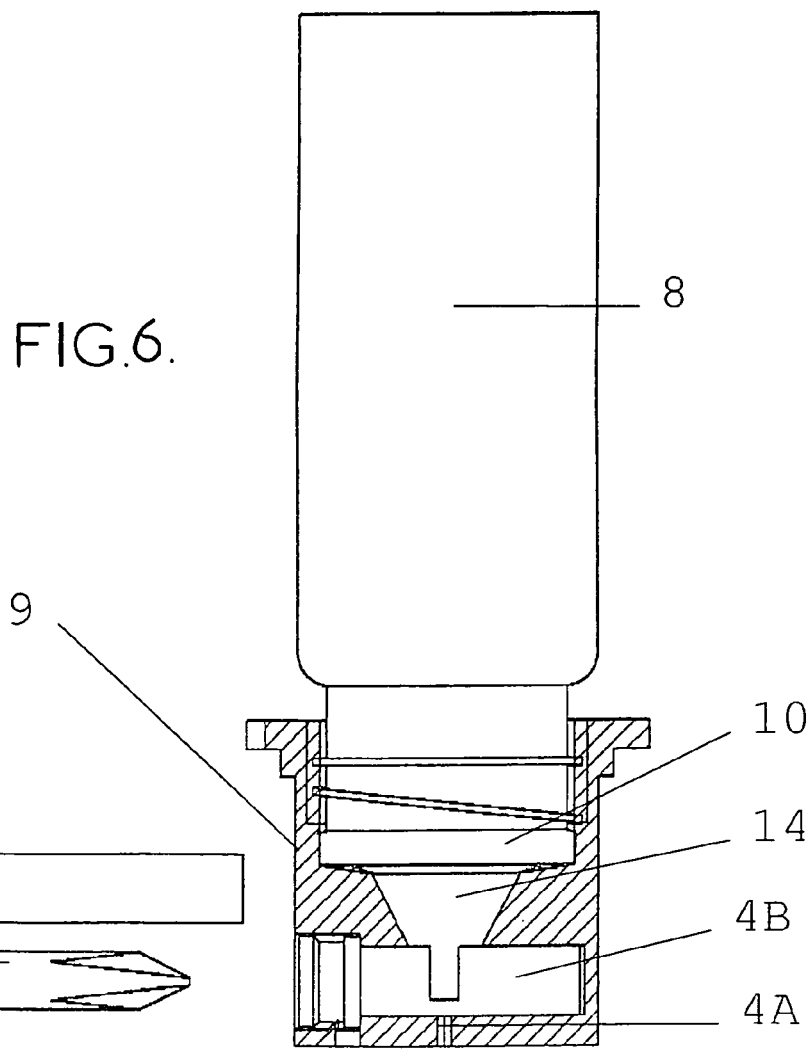
FIG. 6 is another sectioned view of a container according to the invention in a metering position.

FIG. 6 is a view in section of the container (2) ready to operate. The stopper (9) is screwed onto the receptacle (8) around the gasket (10). The hopper (14) feeds the adjustable opening (4A, 4B). A tapping means (28) depicted in the form of a retractable finger (28) is arranged on the side of the container (2) to allow the container (2) to be tapped.

FIGS. 7A, 8A, 9A and 10A and 7B, 8B, 9B and 10B illustrate the operation of a container (2) during the metering operation.

FIGS. 7A, 8A, 9A and 10A are sectioned views of a container (2) and are to be placed in parallel with FIGS. 7B, 8B, 9B and 10B which are views of the lower surface of the same container (2).

Before the start of metering, the adjustable opening (4A) is completely closed off in FIGS. 7A and 7B.

At the start of metering (FIGS. 8A and 8B), the plug (4B) is turned on its axis and slightly opens the adjustable opening (4A) which dispenses the powder (3) at a very low flow rate.

In FIGS. 9A and 9B, the plug (4B) continues to turn and opens the adjustable opening (4A) wider. The flow rate of powder (3) is therefore higher.

Finally, in FIGS. 10A and 10B, the plug (4B) fully opens the adjustable opening (4A) and the flow rate of powder (3) dispensed is then at its maximum.

Figure 11:
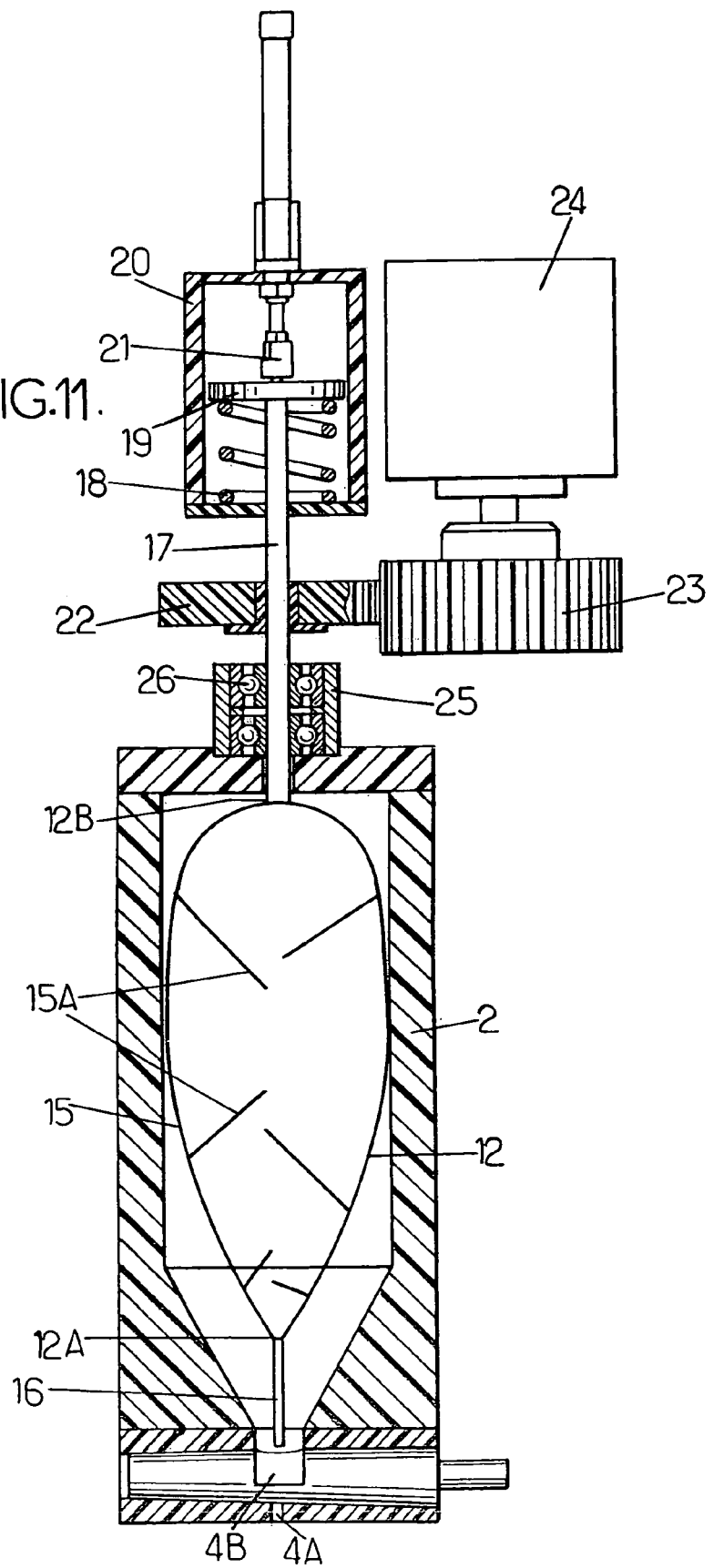
FIG. 11 is a sectioned view of one particular embodiment of the container according to the invention, comprising a stirrer.

FIG. 11 is a perspective view of another embodiment of the container (2) according to the invention. In this embodiment, the container (2) comprises a stirrer (12) in the form of a rotary drill equipped with blades. The rotary drill advantageously also bears a scraper which is a curved blade. The adjustable opening (4A) here comprises an opening (4A) and a valve slide.

FIG. 11 is a sectioned view of one embodiment of a container (2) comprising an opening with a tapered cylindrical plug (4A, 4B) and a stirrer (12).

Figure 12:
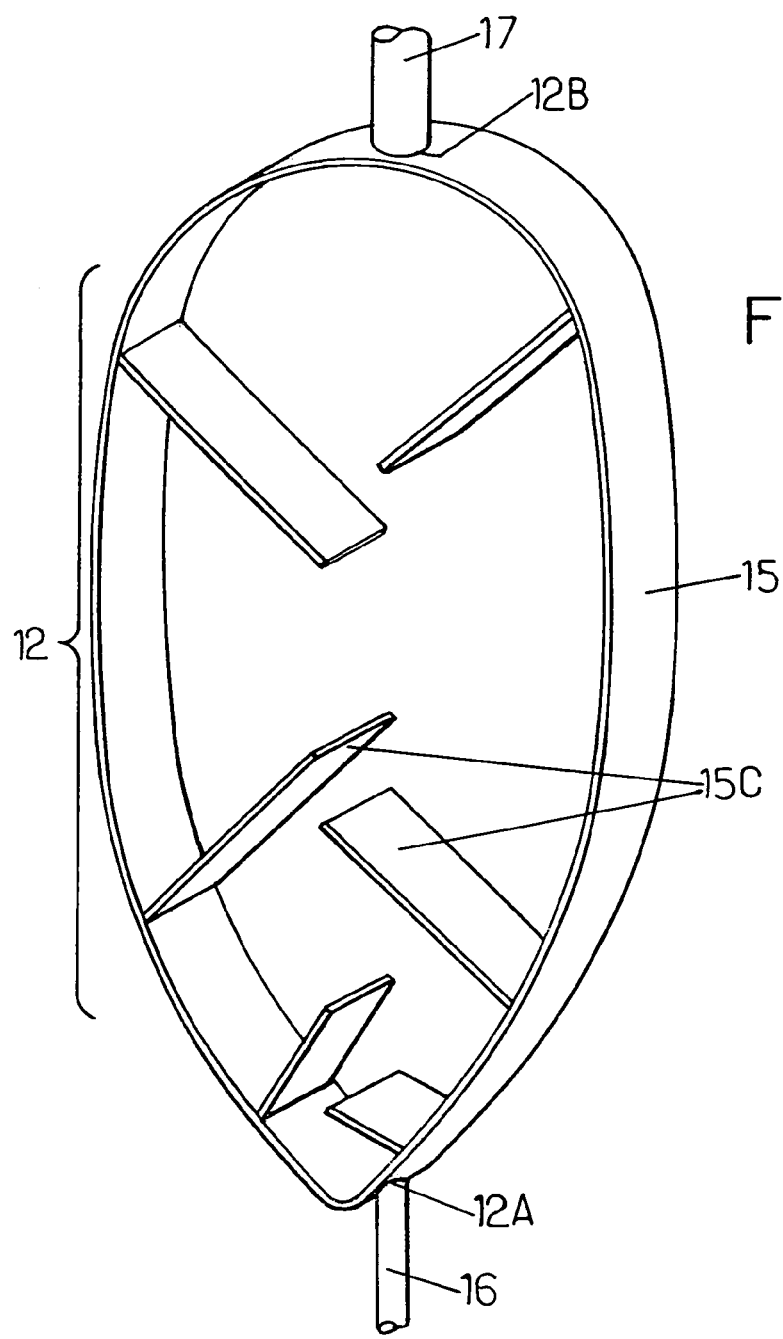
FIG. 12 is a perspective view of the stirrer depicted in FIG. 11.

FIG. 12 is a perspective view of the stirrer (12) depicted in FIG. 11.

In these figures, the stirrer (12) is arranged along an axis passing through the opening (4A, 4B). The stirrer has a first end (12A) which is arranged near the mid-plane of the opening (4A, 4B) and a second end (12B) at the opposite end to the first end (12A). The first end (12A) of said stirrer (12) is a rod (16) and the second end (12B) of said stirrer (12) is a leaf (15) bent back on itself to form a loop that is elongate along said axis passing through the opening (4A, 4B). Said leaf (15) comprises fins (15A) which project from the interior surface of the bent-over leaf (15) toward said axis.

This second end is connected to a device transmitting to the stirrer (12) a back-and-forth movement along said axis passing through the opening (4A, 4B) and a rotational movement about said axis passing through the opening (4A, 4B). The device transmitting a back-and-forth movement to the stirrer comprises a transmission means (17) which is connected to the second end (12B) of the stirrer (12), a pushing means (21) and a pulling means (18).

In this instance, the pushing means (21) is a ram and said pulling element is a spring (18), arranged inside a spring cage (20).

The ram (18) transmits a translational movement to said transmission means (17) via the plate (19) in a first direction along the axis of said transmission means (17). The transmission means (17) therefore transmits a translational movement in a first direction to the stirrer (12). In its translational movement, the transmission means (17) (in this instance a bar) drives the gearing (22) fixed thereto. The gearing (22) therefore moves with respect to the gearing (23).

Through its translational movement, the ram (18) compresses the spring (18) from its rest position into a compressed position. When the action of the ram (18) is halted and the ram no longer applies force to the spring (18), the spring (18) returns to its rest position, transmitting a translational movement to said transmission means (17) in the opposite direction to the direction of travel transmitted by the ram (21). By repeating the action of the ram (21) and of the spring (18) a back-and-forth movement of the stirrer (12) and of the rod (16) is created.

The rod (16) will, as a result, move translationally along the axis of the stirrer (12) in the opening (4A, 4B). This has the effect of feeding or cramming the opening (4A, 4B), something which is particularly advantageous in the case of highly cohesive powders which are difficult to meter. The length of the rod (16) may be sufficient to pass the mid-plane of the opening (4A, 4B) and even protrude from the container (2) by a few millimeters.

The transmission means (17) further comprises driving gearing (22) which is driven by drive gearing (23) fixed to a motor (24). In this way, the stirrer (12) has not only a translational movement along its axis but also a rotational movement about this same axis.

A ball bearing assembly (25) comprising bearings (26) guides the transmission means (17) in its translational and rotational movement.

The apparatus (1) according to the invention is particularly suited to being used in a step of a method for the accurate metering out of powder. The apparatus (1) is also very suited to use in the accurate metering out of powder.

The invention claimed is:

1. An apparatus for accurately metering out powder, comprising:
   a container of powder, comprising:
      an adjustable opening through which the powder is dispensed, said opening being in direct communication with the container;
      adjusting means for adjusting said opening; and
      a checking means for checking the amount of powder dispensed, in relation with said adjusting means; and
   a vibrating and/or tapping means for vibrating or tapping the container, wherein the container further comprises a stirrer situated within the interior volume of said container, and wherein said stirrer is arranged along an axis passing through the opening, said stirrer comprising:
      a first end arranged near a mid-plane of the opening, and
      a second end at the opposite end to the first end and which is connected to a device transmitting to the stirrer a back-and-forth movement along said axis passing through the opening.

2. The apparatus as claimed in claim 1, which is capable to dispense powders with an accuracy of 100 µg or better.

3. The apparatus as claimed in claim 1, which is capable to dispense powders with a mean accuracy of 0.5 mg or better.

4. The apparatus as claimed in claim 1, in which the opening is adjustable to the extent of being completely closed off.

5. The apparatus as claimed in claim 1, in which the opening is in the shape of a triangle.

6. The apparatus as claimed in any claim 1, in which the adjusting means comprises a plug valve or a slide valve.

7. The apparatus as claimed in claim 1, in which the container comprises a receptacle part and a stopper part.

8. The apparatus as claimed in claim 1, in which the container comprises a hopper feeding the opening.

9. The apparatus as claimed in claim 1, in which the adjusting means are controlled by software as a function of checking measurements supplied by the checking means.

10. The apparatus as claimed in claim 1, in which the adjusting means comprise a motor connected to a transmission element actuating the opening or closure of the adjustable opening.

11. The apparatus as claimed in claim 1, in which the checking means is a balance having a weighing accuracy of 0.1 mg or better.

12. The apparatus as claimed in claim 1, in which the means for vibrating and/or tapping the container is a retractable finger that strikes the outside of the container.

13. The apparatus as claimed in claim 1, in which the stirrer includes a rod.

14. The apparatus as claimed in claim 1, in which the first end of said stirrer comprises a rod and the second end of said stirrer comprises a leaf bent back on itself to form a loop that is elongate along said axis passing through the opening, said leaf comprising fins which project from the interior surface of the bent-over leaf toward said axis.

15. The apparatus as claimed in claim 1, in which the device transmitting a back-and-forth movement to the stirrer comprises: a transmission means connected to the second end of the stirrer, a pushing means, a pulling means, said pushing means transmitting a translational movement to said transmission means in a first direction along the axis of said transmission means and said pulling means transmitting a translational movement to said transmission means in the opposite direction to the first direction.

16. The apparatus as claimed in claim 1, in which the device transmitting a rotary movement to the stirrer comprises a transmission means connected to the second end of the stirrer, said transmission means comprising driving gearing which is driven by drive gearing fixed to a motor.

17. The apparatus as claimed in claim 1, in which: the first end of said stirrer comprises a rod and the second end of said stirrer comprises a leaf bent back on itself to form a loop that is elongate along said axis passing through the opening, said leaf comprising fins which project from the interior surface of the bent-over leaf toward said axis, the device transmitting a back-and-forth movement to the stirrer comprises a transmission means connected to the second end of the stirrer, a pushing means, a pulling means, said pushing means transmitting a translational movement to said transmission means in a first direction along the axis of said transmission means and said pulling means transmitting a translational movement to said transmission means in the opposite direction to the first direction, the device transmitting a rotary movement to the stirrer comprises a transmission means connected to the second end of the stirrer, said transmission means comprising driving gearing which is driven by drive gearing fixed to a motor.

18. The apparatus as claimed in claim 1, in which the tapping means and/or the stirrer are controlled by software as a function of checking measurements supplied by the checking means.

19. The apparatus as claimed in claim 1, in which the container further comprises a scraper.

20. A process for accurately metering out powders employing the apparatus as claimed in claim 1, comprising one or more of the following steps:
   bringing the container into the metering position,
   using the adjusting means to open the adjustable opening,
   vibrating or tapping the container,
   using the checking means to measure the amount of powder dispensed, using the adjusting means to open or close the adjustable opening as a function of the measurement returned by the checking means, and adjusting the means that vibrate and/or tap the container as a function of the measurement returned by the checking means.

21. The apparatus of claim 1, wherein the device transmitting to the stirrer a back-and-forth movement also transmits to the stirrer a rotary movement around the axis.

22. The apparatus as claimed in claim 1, which is capable to dispense powders with an accuracy of 50 μg or better.

23. The apparatus as claimed in claim 1, which is capable to dispense powders with an accuracy 10 μg or better.

24. The apparatus as claimed in claim 1, which is capable to dispense powders with a mean accuracy of 0.2 mg or better.

25. The apparatus as claimed in claim 1, which is capable to dispense powders with a mean accuracy of 0.1 mg or better.

26. The apparatus as claimed in claim 1, in which the tapping means and/or the stirrer are controlled by software as a function of checking measurements supplied by the checking means and as a function of characteristics of the powder.

* * * * *